United States Patent [19]

Even

[11] Patent Number: 5,367,424

[45] Date of Patent: Nov. 22, 1994

[54] CIRCUIT FOR PROTECTING AN ELECTRONIC SWITCH AGAINST SHORT CIRCUITS

[75] Inventor: Stéphane Even, Angouleme, France

[73] Assignee: Telemecanique, France

[21] Appl. No.: 812,903

[22] Filed: Dec. 20, 1991

[30] Foreign Application Priority Data

Dec. 21, 1990 [FR] France ................... 90 16139

[51] Int. Cl.⁵ ........................................... H02H 9/02
[52] U.S. Cl. ............................................ 361/18; 361/90
[58] Field of Search ................. 361/18, 71, 74, 90, 361/94; 323/276, 277

[56] References Cited

U.S. PATENT DOCUMENTS

| | | | |
|---|---|---|---|
| 3,602,773 | 8/1971 | Berstein ........................... | 361/74 |
| 4,594,531 | 6/1986 | Ganser et al. ..................... | 315/307 |
| 4,812,736 | 3/1989 | Albach et al. ..................... | 323/224 |
| 4,845,584 | 7/1989 | Numata ............................. | 361/18 |
| 4,937,697 | 6/1990 | Edwards et al. ................... | 361/18 |
| 5,105,324 | 4/1992 | Murari et al. ..................... | 361/18 |

FOREIGN PATENT DOCUMENTS 3130307 2/1983 Germany .................. 361/74

Primary Examiner—A. D. Pellinen
Assistant Examiner—Sally C. Medley
Attorney, Agent, or Firm—William A. Drucker

[57] ABSTRACT

A circuit for protecting an electronic switch against short circuits comprising circuitry for generating a variable voltage which varies in a direction that depends upon the position of a parameter representative of the current flowing through the switch relative to a reference, first and second threshold detectors comparing the variable voltage to first and second thresholds and an RS bistable circuit connected to the first and second threshold detectors to turn the switch OFF and ON when the variable voltage crosses the second or the first threshold respectively on leaving the range defined by the thresholds.

5 Claims, 2 Drawing Sheets

CIRCUIT FOR PROTECTING AN ELECTRONIC SWITCH AGAINST SHORT CIRCUITS

The present invention relates on general to the field of providing short circuit protection for circuits that include electronic switches.

BACKGROUND OF THE INVENTION

To avoid such a switch being destroyed by excessive current surge due to a short circuit, it is known to monitor the current flowing through the switch and to turn the switch OFF as soon as the value of the current exceeds a predetermined threshold, and then to switch the switch back ON after a time delay while being ready to switch it back OFF again quickly if the excessive current persists.

Such a protection circuit should preferably present the following features:

in order to avoid switching OFF the switch unnecessarily, it should ignore brief surges ("transients") that may appear in the load, for example when engaging a capacitive load or in the event of interference;

in order to avoid running the risk of damaging the switch, the lengths of time during which it is switched beck ON again should be as short as possible if the short circuit persists; and in order to return the switch to its normal state as quickly as possible on disappearance of the short circuit state, the time delay should be short.

It can thus be seen that there is a difficulty because these requirements are fundamentally contradictory: to avoid taking account of transients, the sensitivity of the circuit needs to be low, which means that the switch is switched back ON again for longer periods and at a lower repetition rate.

The present invention seeks to provide a protection circuit that satisfies the above conditions while being extremely simple and cheap.

SUMMARY OF THE INVENTION

To this end, the present invention provides a circuit for protecting an electronic switch against short circuits, the circuit comprising:

means for obtaining an electrical parameter representative of the current flowing through the switch;

means for generating a variable voltage that varies in a direction which depends on the position of said parameter relative to a predetermined reference;

first and second threshold detectors receiving said variable voltage and respective first and second thresholds; and memory means contacted to the first and second threshold detectors to switch the switch OFF and ON when the variable voltage crosses the second or the first threshold respectively, on leaving the range defined by said thresholds;

the second threshold being reached only after said parameter has crossed the predetermined reference for a certain length of time, thereby providing a degree of immunity against interference from transients.

With such a circuit, the overload duration that is allowed prior to switching the electronic switch OFF is longer than the length of time said switch is left ON again in the event of a short circuit that persists.

More precisely, the switch is switched OFF only when the variable voltage exceeds the second threshold starting from a value lying outside said range, i.e. if the parameter exceeds the reference for a first predetermined duration, whereas when the short circuit persists, the electronic switch is switched ON again for a second predetermined duration which is limited to the time required by the variable voltage to cross the range from the first threshold to the second threshold, which duration is shorter than the first duration.

BRIEF DESCRIPTION OF THE DRAWINGS

An embodiment of the invention is described by way of example with reference to the accompanying drawings, in which.

DETAILED DESCRIPTION

Figure 1:
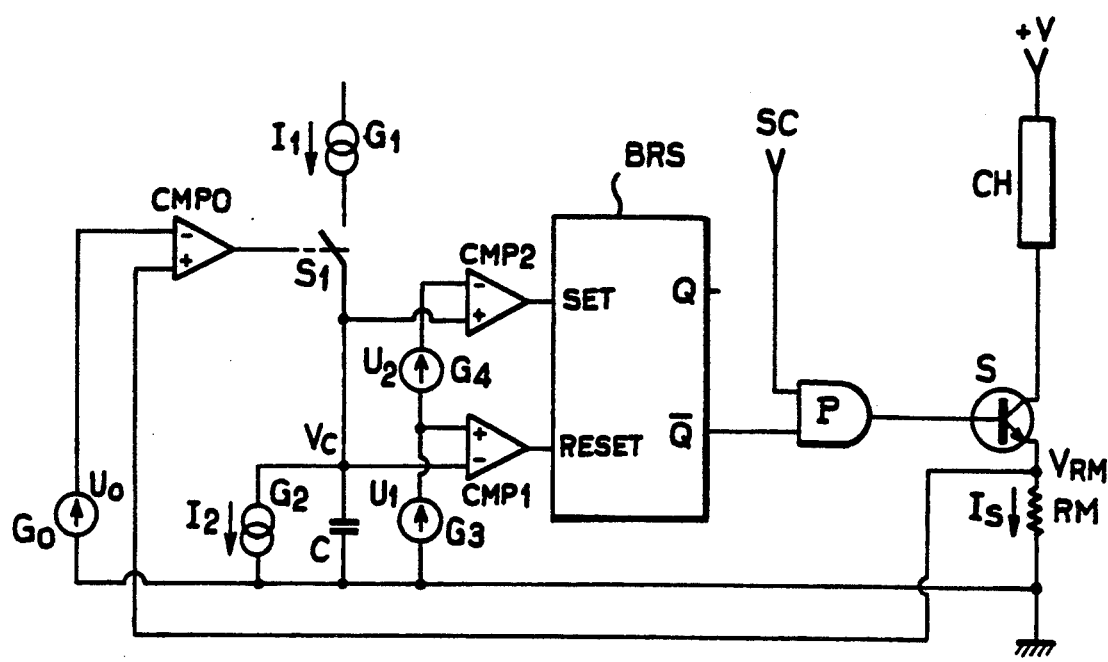
FIG. 1 is a circuit diagram of a protection circuit of the present invention.

With reference initially to FIG. 1, an electronic switch S is shown that needs protecting against short circuits. The switch is associated with a load CH. Although the switch S is represented by an NPN transistor, it could naturally be constituted by any component capable of performing a switching function, and in particular a bipolar transistor or a MOS transistor, a thyristor, etc.

The base of the switch S is controlled by an appropriate control circuit (not shown) which delivers a control signal. SC to an input of the protection circuit for application to said base in a manner described below.

The protection circuit includes a measurement resistor RM connected between the emitter of the switch S and ground. The emitter of the switch S is also connected to the positive input of a first comparator CMP0 whose negative input is connected to a generator G0 for generating a constant reference voltage U0.

The output of CMP0 controls an electronic switch S1 which is connected between a constant current source G1 delivering a constant current I1 and a first terminal of a capacitor C. The second terminal of capacitor C is connected to ground. A second constant current source G2 for delivering a current I2 is connected across the terminals of C. The positive terminal of C is connected firstly to the negative input of a second comparator CMP1 and secondly to the positive input of a third comparator CMP2. The voltage at the positive terminal of C is written VC. A constant voltage generator G3 for generating a voltage U1 is connected between the positive input of CMP1 and ground. A constant voltage generator G4 for generating a voltage U2 is connected between said positive input of CMP1 and the negative input of CMP2.

The output of CMP1 is connected to the RESET input of an RS bistable referenced BRS, while the output of CMP2 is connected to the SET input of the same bistable.

The RS bistable has two complementary outputs Q and $\overline{Q}$, with output $\overline{Q}$ being applied to a first input of an AND gate referenced P. The other input P receives the control signal SC for the switch S. The output of P is connected to the base of the switch S.

The operation of this circuit is described below with reference to FIG. 2 and then with reference to FIG. 3.

Figure 2:
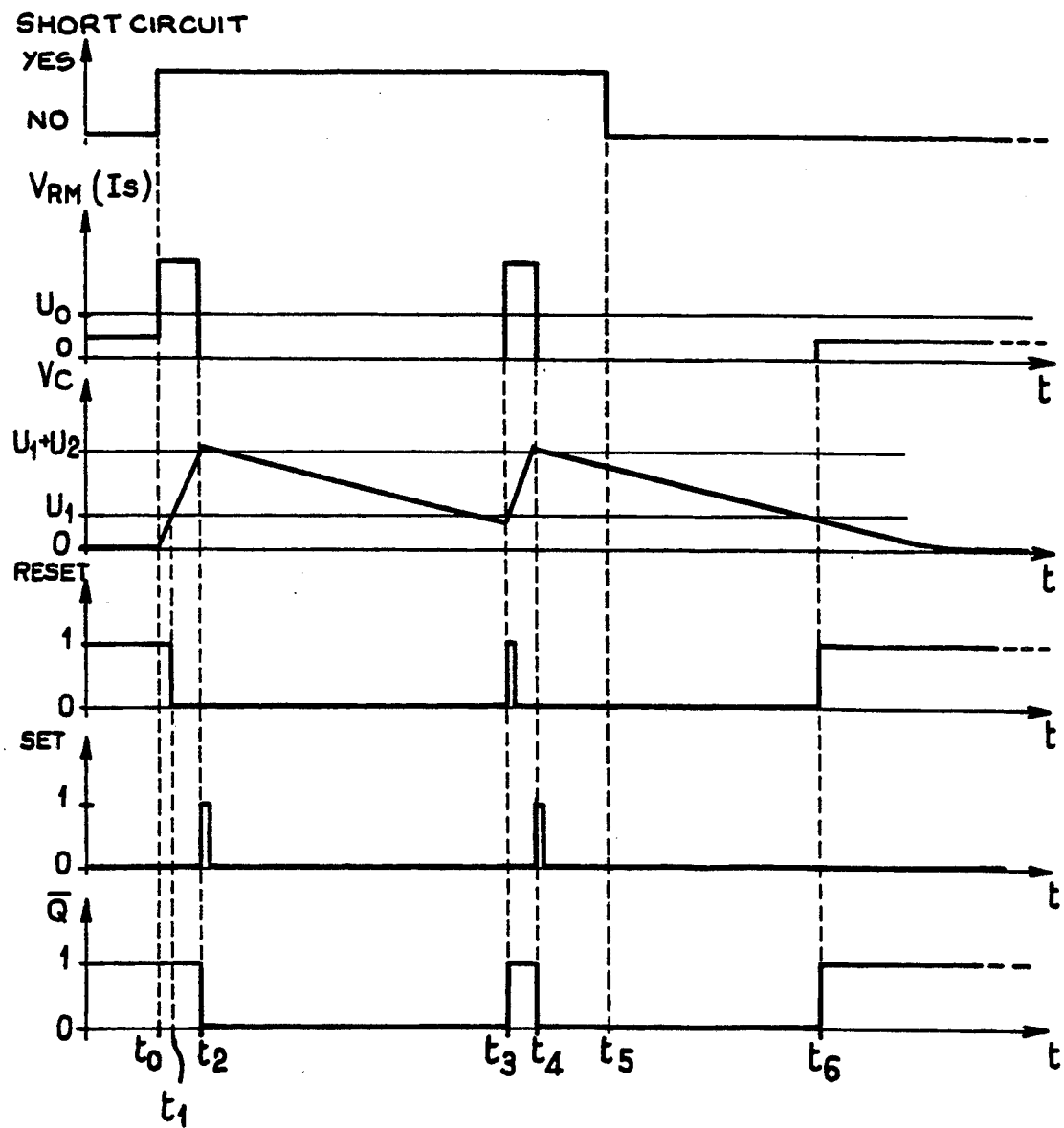

In FIG. 2, when the current IS flowing through the switch to be protected is normal, then the voltage across the terminals of RM which is proportional to the current and which is written VRM is less than the reference voltage U0 of comparator CMP0. As a result S1 is OFF. The capacitor C is in the discharged state because of the current generator G2, and the voltages applied to the negative terminal of CMP1 and to the positive terminal of CMP2 are both zero.

The RESET and SET inputs of the bistable are thus respectively at "1" (high logic level) and at "0" (low logic level).

Consequently, the output $\overline{Q}$ is at high logic level and the control signals for S therefore pass through the AND gate without being altered, thereby switching S ON and OFF as desired.

As soon as excessive current flows through S (instant t0), VRM becomes greater than the reference U0. As a result the output of CMP0 switches to high level, thereby switching S1 ON and causing C to be charged by the generator G1 with current I1. The voltage VC therefore increases with a slope that is determined by the values of C and I1.

When VC passes the first threshold U1 (instant t1), the RESET input of the bistable passes to low logic level, thereby no longer inhibiting the bistable. The output $\overline{Q}$ remains at the same level so the current continues to flow through S, S1 remains ON, and C1 continues to charge, so VC continues to increase. When VC crosses the second threshold U1+U2. (instant t2) the SET input switches to "1", thereby causing the output $\overline{Q}$ to switch to "0" level. As a result the voltage is removed from the base of S and S ceases to conduct.

The voltage at the positive input of CMP0 thus goes to zero, switch S1 is switched OFF, and C discharges via the current generator G2 with current I2.

VC then falls, passing quickly back through the threshold U1+U2 in the downwards direction, thereby putting the SET input back to zero, and after a certain length of time has elapsed also passing downwards through the threshold U1 (instant t3). The RESET input then goes back to "1" thus having the effect of applying a "1" to the gate P and switching the switch S back ON.

In this particular case, the short circuit is still present so the current that flows again through S is such that VRM is immediately greater than U0. C therefore charges again by the same process as described above and VC again rises from U1 to U1+U2 (instant t4), which has the effect of bringing the SET input back to "1" to remove the base voltage from S via the output $\overline{Q}$ and the gate P. The same phenomenon occurs between t4 and t6 as occurs between t2 and t3. However, at an instant t5 before t6 the short circuit disappears so that at t6, when S begins to conduct again by virtue of the output $\overline{Q}$ going to "1" level, the current flowing through S is normal and the voltage VRM is less than U0. S1 therefore remains OFF so VC continues to decrease down to zero, while the RESET signal which switches to "1" at t6, remains at this level to deactivate the bistable BRS.

In FIG. 2, it can be seen that while the short circuit remains in the load, the excursion of VC is limited to the range [U1, U1+U2], which for given charge and discharge slopes of the capacitor makes it possible firstly to limit the ON time of S while the short circuit remains (between t3 and t4), thereby minimizing the risk of damaging this component, and secondly to increase the rate at which the component is switched OFF and ON in succession while it is in this situation, thereby enabling control of the component to be returned to the normal state as quickly as possible once the short circuit has disappeared.

Figure 3:
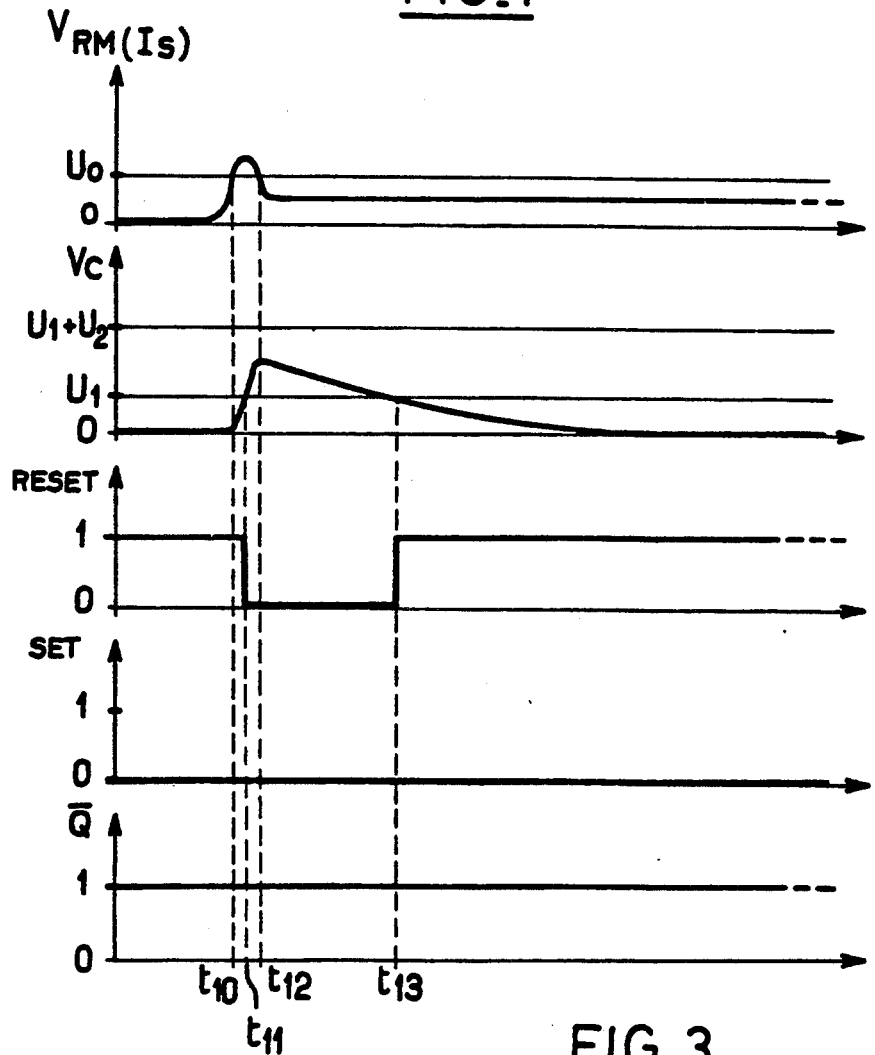
FIGS. 2 and 3 are timing charts showing how the circuit of FIG. 1 operates under two different situations.

FIG. 3 shows the case where the current through the switch to be protected exceeds the normal value temporarily only, i.e. is constituted by a temporary current surge due to the behavior of the load, for example (as can happen when engaging a capacitive load).

At instant t10, VRM crosses reference U0 going upwards, thereby switching ON S1 and charging C. VC therefore increases and crosses U1 at instant t11. The RESET input then switches from "1" to "0". However, at instant t12, before VC has been able to reach the threshold U1+U2, the current flowing through the switch S has already decreased, thereby causing VRM to cross U0 in the downwards direction. S1 is then switched OFF, C discharges, and VC decreases. At instant t13, VC crosses the threshold U1 in the downwards direction and the RESET input goes back to "1", with VC then continuing to decrease to zero.

It may be observed that the SET input of the bistable remains throughout at level "0" such that the output $\overline{Q}$ remains at "1" and the switch has remained under normal control from the control input via gate P.

More specifically, the circuit of the present invention authorizes an overload time during which the current is allowed to exceed the threshold corresponding to U0 without triggering the circuit, which time is equal to C. (U1+U2)/I1.

Thus, the protection circuit of the present invention makes it possible to discriminate between a long term increase in current due to a short circuit and a temporary increase in current due to a surge or an overload that does not require the switch to be taken out of conduction.

It should be observed that the authorized overload time which corresponds to the time taken by VC to rise from 0 to U1+U2 is greater than the time (above-mentioned time interval t4-t3) during which the switch is ON again while a short circuit subsists. The invention thus makes it possible to reduce this ON-again time without compromising the quality of the circuit's immunity to transients.

In a variant embodiment (not shown) for further improving discrimination between a genuine short circuit state and a transient, provision may be made to apply the voltage VRM to two comparators having different reference values U0 and U'0, with these comparators serving to charge C at different current values, and more precisely with a lower current for the lower voltage threshold. Under such circumstances, providing the excessive current that is not due to a short circuit crosses the lower threshold only, the load may continue to be connected even for a relatively long period of time since VC increases at its lower rate.

In practice, the FIG. 1 circuit is advantageously implemented in integrated form, and only the components RM, and C, and naturally also the component to be protected, are external thereto. Under such circumstances, by an appropriate choice for the value of C, it is possible to determine both the protection cycle frequency during a short circuit and the time during which excessive current is authorized without triggering the protection circuit.

In addition, the voltages U1 and U1+U2, and also the currents I1 and I2 may be selected at will when designing the circuit. It has been observed that a circuit where the ratio of U1+U2 to U1 is about 3 to 1, provides a good compromise between protection cycle frequency and circuit immunity to transients. Also, I1 and I2 respectively determine the up and down slopes of the voltage VC, and they may be selected to be at a ratio of about 60 to 1. This gives a mark-space ratio of about 1 to 60 for the short circuit protection cycle and puts a good limit on the conduction times of the switch during a short circuit state.

Naturally, the present invention is not limited to the embodiment described above and shown in the drawings, and persons skilled in the art will be able to make any variants or modifications that occur to them.

As mentioned above, the present invention is applicable to protecting electronic switches of any type. It can be used in particular for inductive proximity or presence detectors, but that application is not limiting in any way.

I claim:

1. A circuit for protecting an electronic switch against damage by an overcurrent caused by a short circuit in a load connected in series with said electronic switch, the circuit comprising:
    (a) an electronic switch;
    (b) means for obtaining an electrical parameter representative of the current flowing through said switch;
    (c) means for generating a variable voltage that varies in a direction which depends on the value of said parameter relative to a predetermined reference;
    (d) first and second threshold detectors defining a range between a first threshold and a second threshold, each having a pair of input terminals, one said input terminal receiving said variable voltage and the other input terminal receiving a signal indicative of a respective first or second threshold; and
    (e) memory means connected to and controlled by said first and second threshold detectors to switch said switch OFF and ON when said variable voltage crosses said second or said first threshold respectively, on leaving the range defined by said thresholds;
    (f) said second threshold being reached only after said parameter has crossed said predetermined reference for a predetermined length of time to provide a degree of immunity against interference;
    (g) wherein said means for generating a variable voltage comprising a threshold detector comparing said parameter with said reference, a capacitor, and means for charging and discharging said capacitor, said variable voltage being taken from a terminal of said capacitor.

2. A circuit according to claim 1, wherein said means for charging and discharging said capacitor comprises first and second current generators respectively, said first current generator delivering a current that is substantially greater than the current delivered by said second current generator to provide a low mark-space ratio when said electronic switch is ON and OFF while a short circuit exists.

3. A circuit according to claim 1, wherein said memory means comprises a RESET-SET bistable having a SET input and a RESET input receiving the output from said first threshold detector on said RESET input and receiving the output from said second threshold detector on said SET input.

4. A circuit according to claim 1, further including a logic gate having a first input receiving a control signal for said electronic switch and having a second input receiving the output from said memory means, the output of said logic gate being connected to a control input of said electronic switch.

5. A circuit according to claim 4, wherein said logic gate is an AND gate.

* * * * *